US008842410B2

(12) United States Patent
Chan

(10) Patent No.: US 8,842,410 B2
(45) Date of Patent: Sep. 23, 2014

(54) SWITCHABLE INDUCTOR NETWORK

(75) Inventor: Ngar Loong A. Chan, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 12/551,390

(22) Filed: Aug. 31, 2009

(65) Prior Publication Data

US 2011/0051308 A1 Mar. 3, 2011

(51) Int. Cl.

| | |
|---|---|
| ***H01H 9/28*** | (2006.01) |
| ***H01H 27/00*** | (2006.01) |
| ***H01H 47/00*** | (2006.01) |
| ***H01H 63/00*** | (2006.01) |
| ***H01F 21/12*** | (2006.01) |
| *H01F 5/00* | (2006.01) |
| *H01F 27/30* | (2006.01) |
| *H01F 41/00* | (2006.01) |
| *H01F 27/28* | (2006.01) |
| *H02J 1/00* | (2006.01) |

(52) U.S. Cl.

CPC ............ *H01F 21/12* (2013.01); *H01F 27/2804* (2013.01)

USPC ........... 361/268; 336/147; 336/200; 323/346; 307/37

(58) Field of Classification Search

CPC ........................................................ H01F 21/12

USPC ................... 361/268; 336/147, 200; 323/346; 307/37

See application file for complete search history.

(56) References Cited

U.S. PATENT DOCUMENTS

| | | | | |
|---|---|---|---|---|
| 6,992,532 | B2 * | 1/2006 | Christensen | 331/117 FE |
| 7,091,784 | B1 * | 8/2006 | Terrovitis | 330/252 |
| 7,132,918 | B2 * | 11/2006 | Baarman et al. | 336/188 |
| 7,292,102 | B2 * | 11/2007 | Lee et al. | 330/254 |
| 7,312,685 | B1 * | 12/2007 | Lee | 336/200 |
| 7,362,194 | B2 * | 4/2008 | Komurasaki et al. | 331/181 |
| 7,463,205 | B2 * | 12/2008 | Turner et al. | 343/718 |
| 8,054,153 | B2 * | 11/2011 | Jeon et al. | 336/200 |
| 2003/0151881 | A1 * | 8/2003 | Yue | 361/268 |

(Continued)

FOREIGN PATENT DOCUMENTS

| | | |
|---|---|---|
| CN | 101253586 A | 8/2008 |
| JP | 7142258 | 6/1995 |

(Continued)

OTHER PUBLICATIONS

"A 900-MHz 1.5-V CMOS Voltage-Controlled Oscillator Using Switched Resonators With a Wide Tuning Range." Zhenbiao Li, Student Member, IEEE, and Kenneth O, Member, IEEE, IEEE Microwave and Wireless Components Letters, vol. 13, No. 4, pp. 137-139, Apr. 2003.

A Digitally Controlled Band-Switching VCO Using Switching Inductors and Capacitors in 0.18 m CMOS.Tienyu Chang, Jinghong Chen, Jenshan Lin, Department of Electrical Engineering, University of Florida, Gainesville, FL, Microwave and Optical Technology Letters, vol. 50, No. 7., pp. 1970-1973.

(Continued)

*Primary Examiner* — Jared Fureman
*Assistant Examiner* — Lucy Thomas
(74) *Attorney, Agent, or Firm* — Kevin T. Cheatham

(57) ABSTRACT

Techniques for providing a switchable inductor network having configurable inductance in response to a control signal. The switchable inductor network may adopt a fully symmetric architecture to reduce the effects of parasitic elements in differential mode operation. The switchable inductor network is particularly suitable for multi-mode communications circuitry applications, e.g., in the design of a voltage-controlled oscillator (VCO) or an amplifier or buffer in such circuitry.

21 Claims, 11 Drawing Sheets

(56) References Cited

U.S. PATENT DOCUMENTS

| | | | |
|---|---|---|---|
| 2004/0017278 | A1 | 1/2004 | Castaneda et al. |
| 2005/0068146 | A1 | 3/2005 | Jessie |
| 2006/0197642 | A1 | 9/2006 | Hargrove et al. |
| 2006/0229030 | A1 | 10/2006 | Simon et al. |
| 2006/0270377 | A1 | 11/2006 | Bhatti et al. |
| 2007/0141998 | A1 | 6/2007 | Zolfaghari |
| 2007/0279099 | A1 | 12/2007 | Goddard et al. |
| 2009/0174493 | A1 | 7/2009 | Jeon et al. |

FOREIGN PATENT DOCUMENTS

| | | | |
|---|---|---|---|
| JP | 8045744 | | 2/1996 |
| JP | 2001068344 | A | 3/2001 |
| JP | 2005057270 | A | 3/2005 |
| JP | 2007005498 | A | 1/2007 |
| KR | 20070028926 | A | 3/2007 |

OTHER PUBLICATIONS

"Design of Wide Tuning-Range CMOS VCOs Using Switched Coupled-Inductors" Murat Demirkan, Student Member, IEEE, Stephen P. Bruss, Student Member, IEEE, and Richard R. Spencer, Fellow, IEEE, IEEE Journal of Solid-State Circuits, vol. 43, No. 5, pp. 1156-1163, May 2008.

International Search Report and Written Opinion—PCT/US2010/047387—ISA/EPO—Apr. 13, 2011.

Yim, et al., "Switched Resonators and Their Applications in A Dual-Band Monolithic CMOS LC-Tuned VCO", Jan. 2006, pp. 74-81, IEEE Transactions on Microwave Theory and Techniques, vol. 54, No. 1.

* cited by examiner

SWITCHABLE INDUCTOR NETWORK

TECHNICAL FIELD

The disclosure relates to the design of inductors for integrated circuits (IC's).

BACKGROUND

Modern wireless communications devices often support multi-mode operation, e.g., signal transmission and reception over multiple radio frequency ranges, using one or more of several distinct communications protocols or standards. For example, a single cellular phone may communicate using any or all of the WCDMA, CDMA, GSM, EDGE, and LTE standards for cellular telephony, over any frequency ranges allotted for such communications.

Multi-mode operation may require the use of circuit elements having different values in each frequency range, e.g., a different inductance value in each frequency range, to optimally tune the circuit for operation in that frequency range. Conventional techniques may resort to providing separate inductors and/or instances of circuitry for each frequency range. This may undesirably increase the die area, as well as the design complexity of the communications devices.

It would be desirable to provide an inductor having configurable inductance to support multi-mode operation in a communications device.

SUMMARY

An aspect of the present disclosure provides an apparatus providing a selectable inductance across a pair of nodes, the apparatus comprising a switchable inductor network comprising: a first coil having terminals coupled to the pair of nodes; a second coil having terminals coupled to the pair of nodes, the second coil comprising at least a first segment and a second segment; and a switch configured to selectively couple or decouple the first segment to the second segment in response to a control signal.

Another aspect of the present disclosure provides a method for providing a selectable inductance across a pair of nodes in a switchable inductor network, the switchable inductor network comprising a first coil having terminals coupled to the pair of nodes, the switchable inductor network further comprising a second coil having terminals coupled to the pair of nodes, the second coil comprising at least a first segment and a second segment, the method comprising: selectively coupling or decoupling the first segment to the second segment in response to a control signal.

Yet another aspect of the present disclosure provides an apparatus providing a selectable inductance across a pair of nodes, the apparatus comprising: means for selecting the inductance of the switchable inductor network from among at least two settings.

Yet another aspect of the present disclosure provides a device for wireless communications, the device comprising a TX LO signal generator, a TX PLL coupled to the TX LO signal generator, at least one baseband TX amplifier, an upconverter coupled to the TX LO signal generator and the at least one baseband TX amplifier, a TX filter coupled to the output of the upconverter, a power amplifier (PA) coupled to the TX filter, an RX LO signal generator, an RX PLL coupled to the RX LO signal generator, an RX filter, a downconverter coupled to the RX LO signal generator and the RX filter, a low-noise amplifier (LNA) coupled to the RX filter, and a duplexer coupled to the PA and the LNA, at least one of the RX LO signal generator and the TX LO signal generator comprising a switchable inductor network comprising: a first coil having terminals coupled to the pair of nodes; a second coil having terminals coupled to the pair of nodes, the second coil comprising at least a first segment and a second segment; and a switch configured to selectively couple or decouple the first segment to the second segment in response to a control signal.

Yet another aspect of the present disclosure provides a device for wireless communications, the device comprising a TX LO signal generator, a TX PLL coupled to the TX LO signal generator, at least one baseband TX amplifier, an upconverter coupled to the TX LO signal generator and the at least one baseband TX amplifier, a TX filter coupled to the output of the upconverter, a power amplifier (PA) coupled to the TX filter, an RX LO signal generator, an RX PLL coupled to the RX LO signal generator, an RX filter, a downconverter coupled to the RX LO signal generator and the RX filter, a low-noise amplifier (LNA) coupled to the RX filter, and a duplexer coupled to the PA and the LNA, at least one of the RX LO signal generator and the TX LO signal generator comprising an LO buffer, the LO buffer comprising a switchable inductor network comprising: a first coil having terminals coupled to the pair of nodes; a second coil having terminals coupled to the pair of nodes, the second coil comprising at least a first segment and a second segment; and a switch configured to selectively couple or decouple the first segment to the second segment in response to a control signal.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
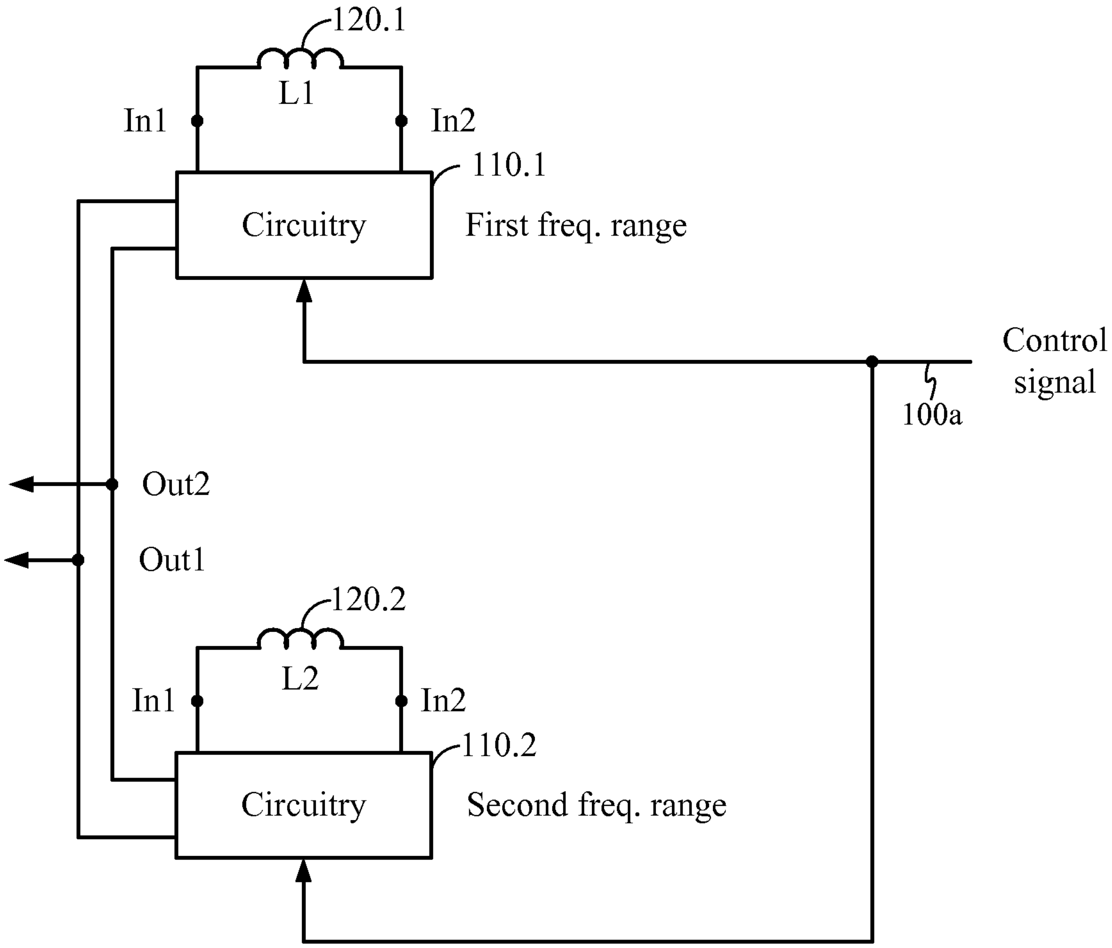
(PRIOR ART) FIG 1
FIG. 1 illustrates a simplified block diagram of a prior art PLL.

FIG. 1 illustrates a prior art technique for designing multi-mode circuitry for operation in two distinct frequency ranges. In FIG. 1, circuitry 110.1 is designed for operation in a first frequency range, and is shown coupled at its nodes In1 and In2 to a first inductor L1 120.1. Circuitry 110.2 is designed for operation in a second frequency range distinct from the first frequency range, and is shown coupled at its nodes In1 and Int2 to a second inductor L2 120.2. Both circuitry 110.1 and circuitry 110.2 are coupled to a control signal 100*a*, which selects either of the circuitry 110.1 or 110.2 for operation depending on, e.g., a desired frequency range of operation. The outputs of circuitry 110.1 and circuitry 110.2 are coupled to each other at output nodes Out1 and Out2.

One of ordinary skill will appreciate that in some applications, circuitry 110.1 and circuitry 110.2 may utilize identical circuit designs. In such applications, the provision of separate circuitry 110.1 and 110.2 as shown in FIG. 1 may undesirably increase the IC die area and complicate the design of the multi-mode circuitry.

Figure 2:
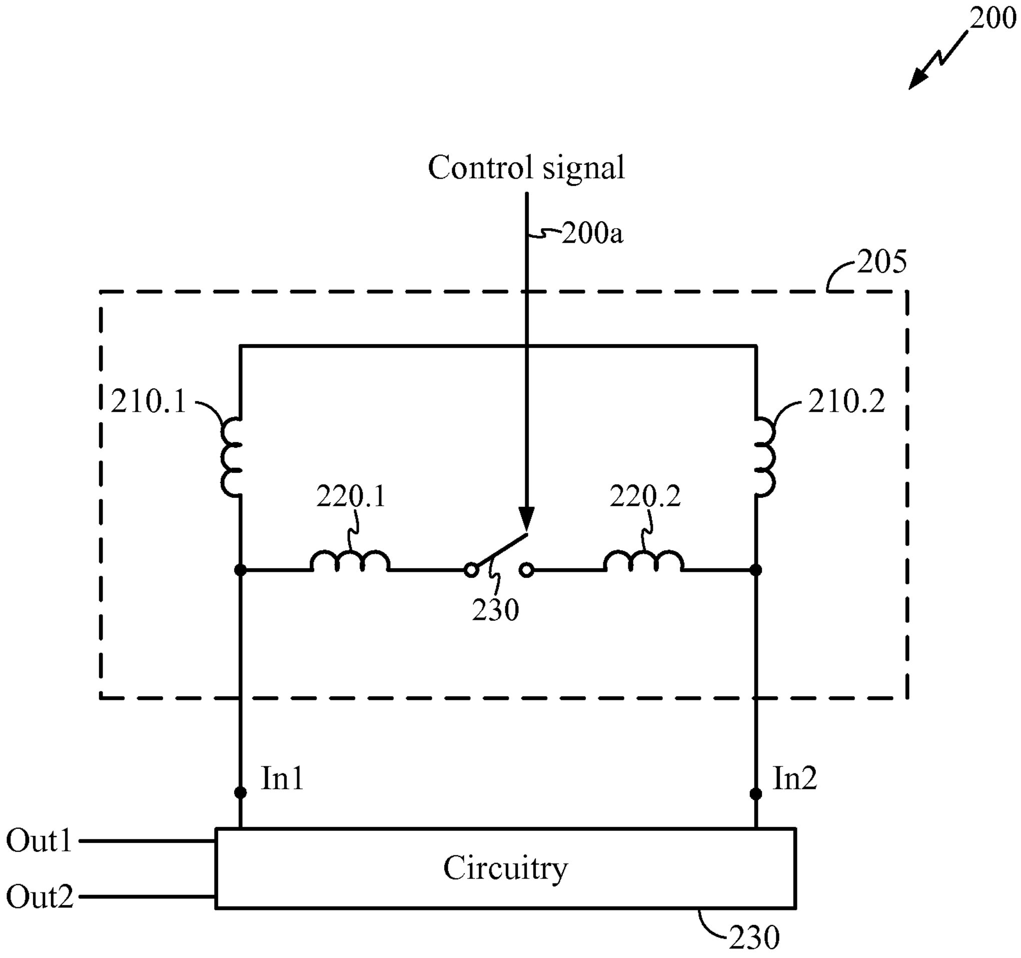
FIG. 2 illustrates an exemplary embodiment of a design for multi-mode circuitry according to the present disclosure.

FIG. 2 illustrates an exemplary embodiment 200 of a design for multi-mode circuitry according to the present disclosure. In FIG. 2, a single instance of circuitry 230 is provided, and the nodes In1 and In2 of the circuitry 230 are coupled to a switchable inductor network 205. The output of the circuitry 230 is provided at output nodes Out1 and Out2.

The switchable inductor network 205 includes a primary inductor 210, shown in FIG. 2 as divided into two series-coupled inductors 210.1 and 210.2. The switchable inductor network 205 further includes a switchable inductor 220, shown in FIG. 2 as divided into two series-coupled inductors (or segments) 220.1 and 220.2 coupled by a switch 230. A control signal 200*a* controls the configuration of the switch 230, and, e.g., may either close the switch 230 to enable the series combination of 220.1 and 220.2 to appear in parallel with the inductor 210 across the nodes In1 and in2, or may open the switch 230 to disable 220.1 and 220.2.

One of ordinary skill in the art will appreciate that the parallel combination of inductors 210 and 220 due to the switch 230 being closed generally has a lower inductance than the single inductor 210 present when the switch 230 is open. Thus, in an exemplary embodiment, the switch 230 may be open to enable operation by the circuitry 200 in a first frequency range, and the switch 230 may be closed to enable operation by the circuitry 200 in a second frequency range higher than the first frequency range. Multi-mode operation in two frequency ranges is thus achieved using the circuitry 200. One of ordinary skill in the art will appreciate that the techniques disclosed are readily extendible to more than one switchable inductor coupled in parallel with inductor 210 to enable multi-mode operation in more than two frequency ranges. Such alternative exemplary embodiments are contemplated to be within the scope of the present disclosure.

Figure 2A:
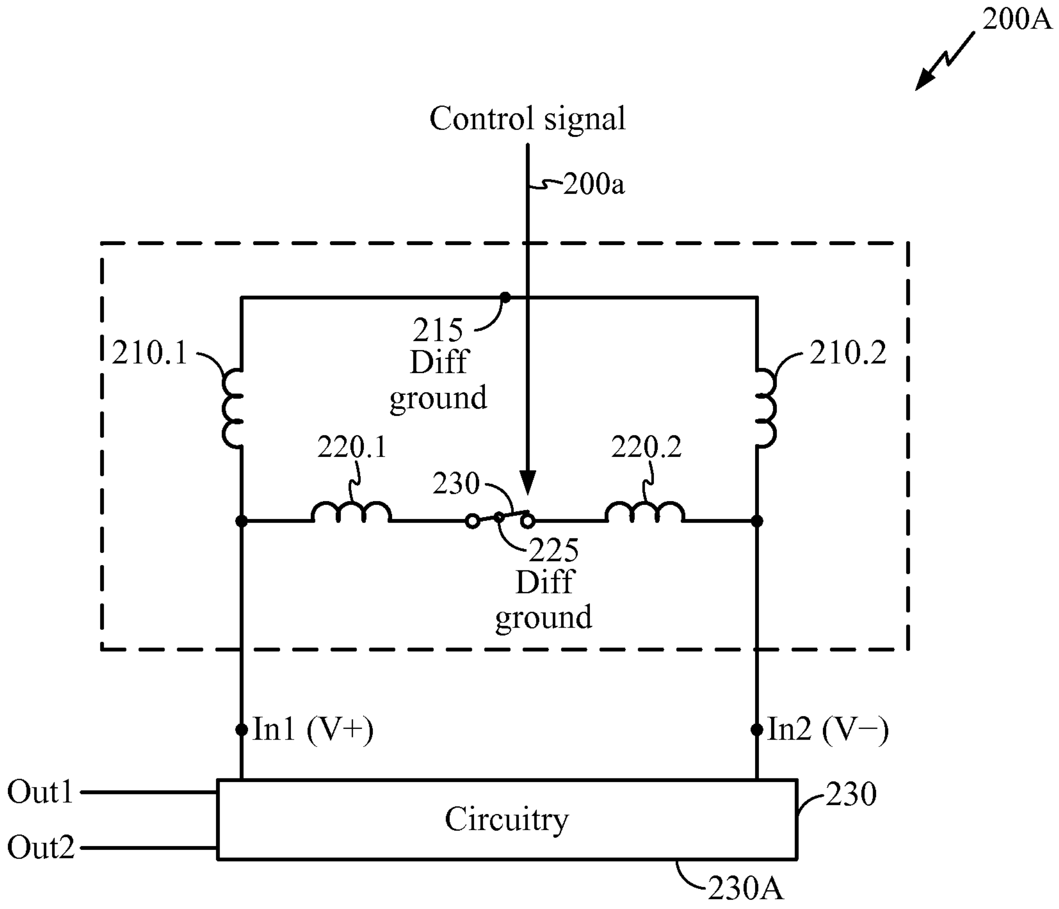
FIG. 2A illustrates an exemplary embodiment of circuitry that provides a differential voltage V+ and V− at nodes In1 and In2, respectively.

FIG. 2A illustrates an exemplary embodiment 200A of circuitry 230A that provides a differential voltage V+ and V− at nodes In1 and In2, respectively. In an exemplary embodiment, the physical layout of the inductors 210 and 220 may preferably be made symmetric about an axis crossing a physical mid-point between the nodes In1 and In2, such that, e.g., a differential ground exists at the mid-point node 215 between 210.1 and 210.2, and at the mid-point node 225 between 220.1 and 220.2 when the switch 230 is closed, as shown in FIG. 2A. The provision of differential ground at nodes 215 and 225 may advantageously reduce the effects of parasitic elements in the circuit 200A, as further described hereinbelow.

Figure 3:
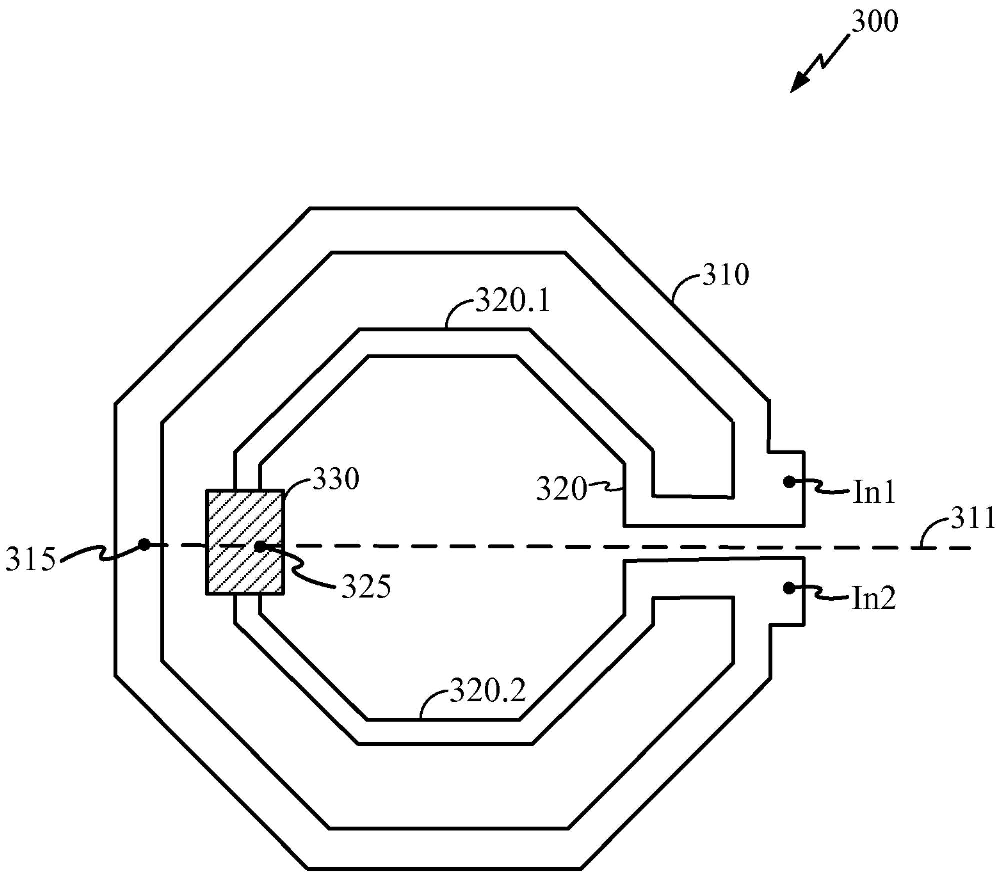
FIG. 3 illustrates an exemplary embodiment of a physical layout of the switchable inductor network of FIGS. 2 and 2A.

FIG. 3 illustrates an exemplary embodiment 300 of a physical layout of the switchable inductor network 205 of FIGS. 2 and 2A. In FIG. 3, the switchable inductor network 300 is physically laid out as an inner coil 320 inside an outer coil 310, with input terminals In1 and In2 coupled to both the inner coil 320 and the outer coil 310. The inner coil 320 includes two sections 320.1 and 320.2 coupled at a mid-point node 325 by a switch 330. By opening and closing the switch 330, the inductance associated with the inner coil 320 may be selectively disabled and enabled to implement the functionality of the switchable inductor network 205 described with reference to FIG. 2.

One of ordinary skill in the art will appreciate that in an aspect, the physical layout shown in FIG. 3 advantageously reduces the die area need to implement inductor network 205 in an IC, by providing the inner coil 320 within an open area that already exists within the outer coil 310.

In FIG. 3, mid-point nodes 315 and 325 may correspond to the physical mid-points of the outer coil 310 and the inner coil 320, respectively. One of ordinary skill in the art will appreciate that such mid-point nodes advantageously correspond to differential ground nodes of the switchable inductor network 300 when the voltages at In1 and In2 vary in a differential manner. In the exemplary embodiment shown, the inner coil 320 and outer coil 310 are laid out symmetrically about an axis 311 that runs through the mid-point nodes 315 and 325.

In an exemplary embodiment, the outer coil 310 may be designed to have a wider width than the inner coil 320. In such an embodiment, the inner coil 320 will have a correspondingly lower inductance than the outer coil 310, and most of the high-frequency current will therefore pass through the inner coil 320 when the switch 330 is closed.

In an exemplary embodiment, the separation between the outer coil 310 and the inner coil 320 may be sufficiently great such that the mutual coupling is negligible in computing the overall inductance of the combination of the outer coil 310 and the inner coil 320 when the switch 330 is closed. This may advantageously simplify computer simulation of circuitry incorporating the switchable inductor network 300.

Figure 4:
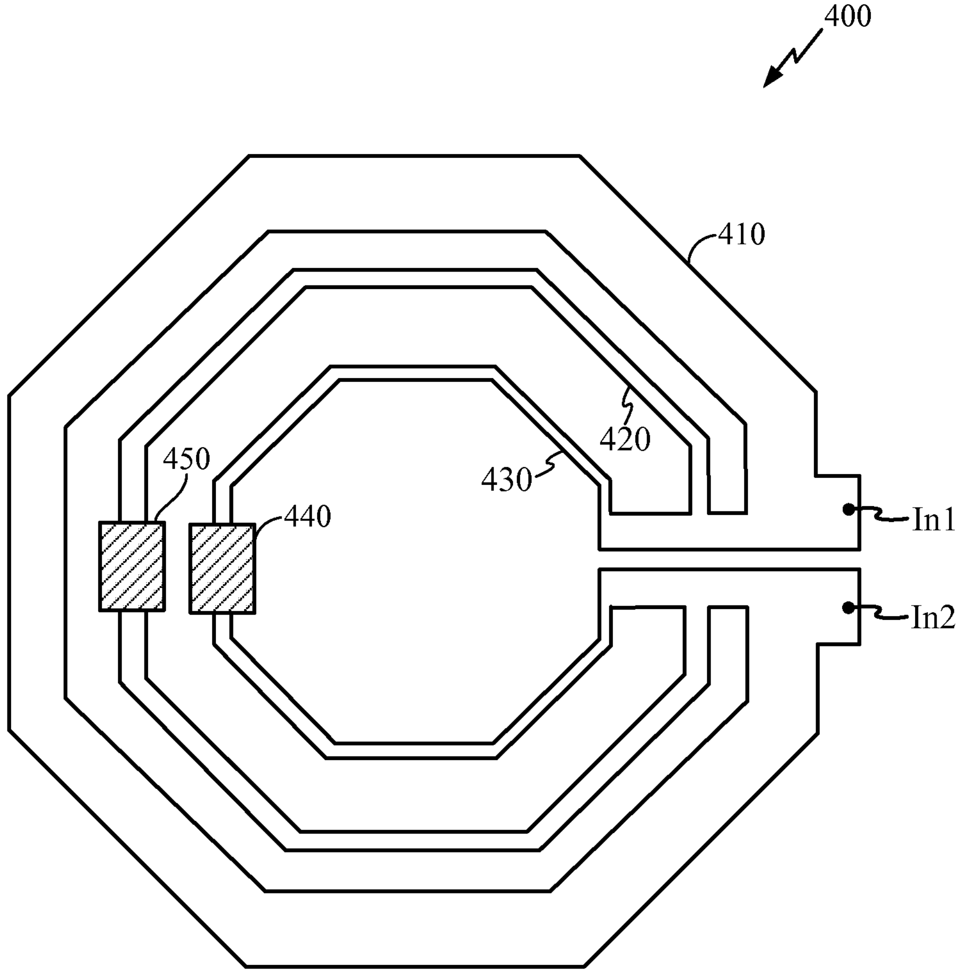
FIG. 4 illustrates an exemplary embodiment of a switchable inductor network accommodating more than one switchable inductor.

One of ordinary skill in the art will appreciate that various modifications in the layout and configuration of the switchable inductor network are possible within the scope of the present disclosure. For example, FIG. 4 illustrates an exemplary embodiment 400 of a switchable inductor network accommodating more than one switchable inductor. In FIG. 4, two inner coils 420 and 430 are provided inside the outer coil 410. The inner coils 420 and 430 are selectively enabled by corresponding switches 450 and 440, respectively. One of ordinary skill in the art will appreciate that by providing multiple nested coils as shown, more than two modes of operation for the switchable inductor network are possible. Such alternative exemplary embodiments are contemplated to be within the scope of the present disclosure.

Figure 5:
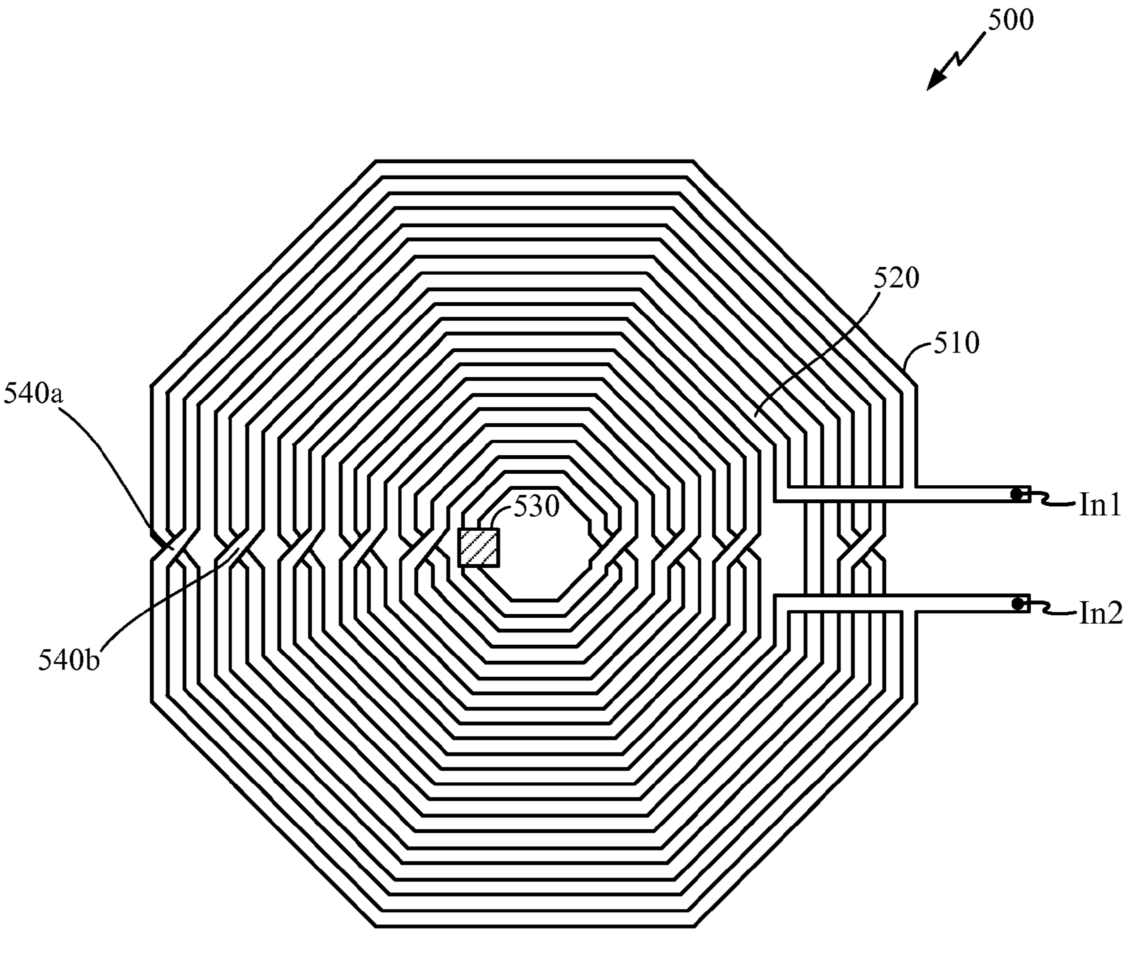
FIG. 5 illustrates an alternative exemplary embodiment of a switchable inductor network optimized for area-constrained design applications.

FIG. 5 illustrates an alternative exemplary embodiment 500 of a switchable inductor network optimized for area-constrained design applications. In the embodiment 500, an inner coil 520 is nested within an outer coil 510, with each coil having multiple turns. Overlapping turns of the coil without direct electrical contact, e.g., at points such as 540*a* and 540*b* in FIG. 5, may be achieved using, e.g., upper and lower metal layers in a standard silicon process well-known to one of ordinary skill in the art. A switch 530 may be provided to enable or disable the inductance of the inner coil 520 according to the techniques of the present disclosure.

In certain exemplary embodiments, the metal widths of both the outer coil 510 and the inner coil 520 may be made narrow to minimize the area needed for their layout. As in some instances, narrower metal width may be related to lower overall quality factor (Q) of the inductor, the embodiment 500 may be adopted in, e.g., certain area-constrained applications wherein lower inductor quality factor (Q) may be tolerated.

Figure 6:
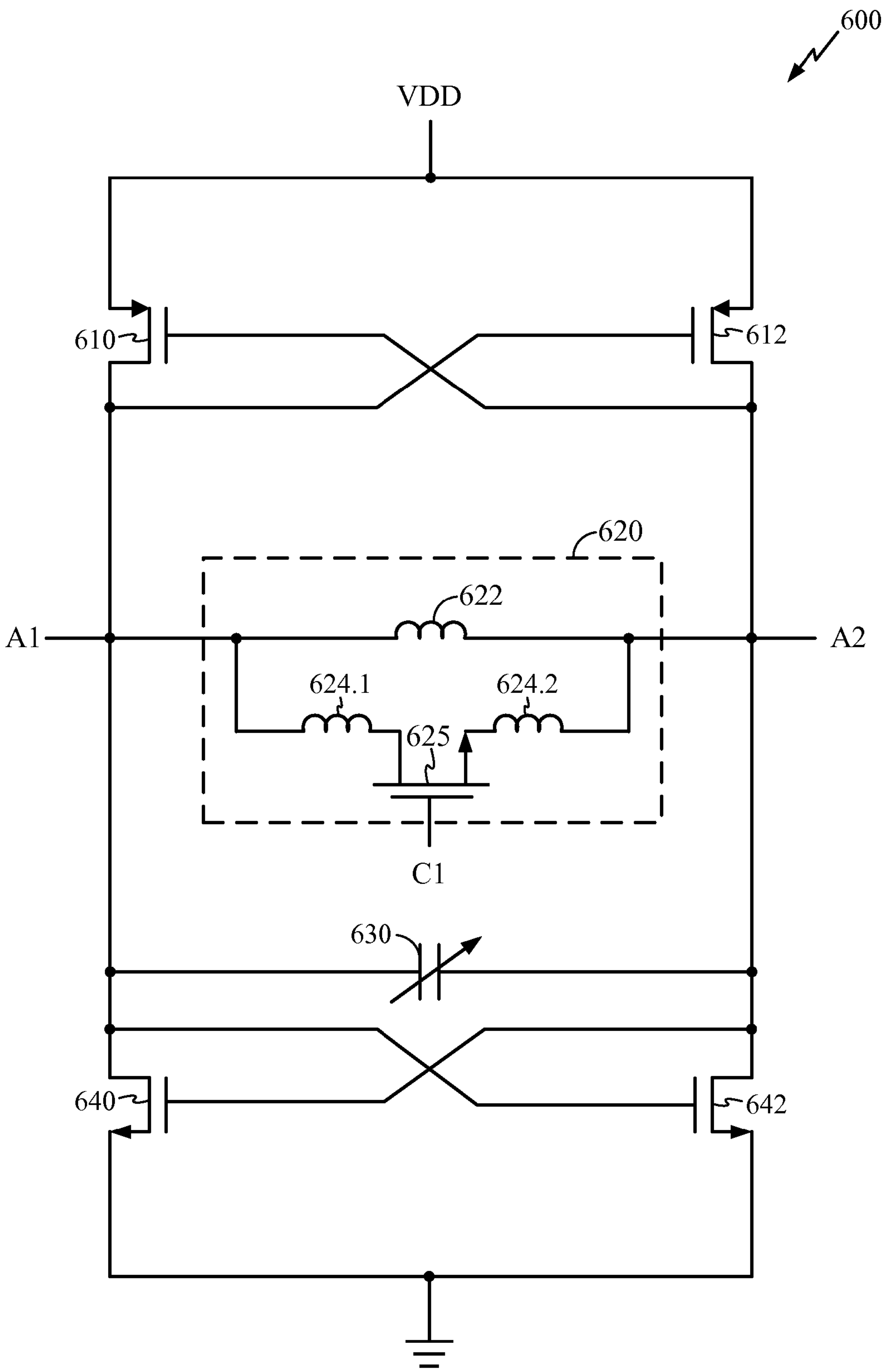
FIG. 6 illustrates an exemplary embodiment of a CMOS voltage-controlled oscillator (VCO) utilizing a switchable inductor network according to the present disclosure.

FIG. 6 illustrates an exemplary embodiment 600 of a CMOS voltage-controlled oscillator (VCO) utilizing a switchable inductor network according to the present disclosure. The VCO 600 includes a cross-coupled PMOS transistor pair 610, 612 coupled to a cross-coupled NMOS transistor pair 640, 642 at nodes A1 and A2. Further coupled to nodes A1 and A2 are a varactor 630 having a voltage-controlled capacitance and a switchable inductor network 620 utilizing the techniques of the present disclosure. As earlier described herein, the switchable inductor network 620 may include a primary inductor 622 and a switchable inductor 624 split into two inductors 624.1 and 624.2 coupled by a switch 625. The overall inductance of the switchable inductor network 620 is selectable by a control signal C1 controlling a switch transistor 625, according to the principles earlier described herein.

In an exemplary embodiment, the switchable inductor network 620 may be designed using the either of the physical layout of the embodiments 300 or 400 shown in FIGS. 3 and 4, or other physical layouts within the scope of the present disclosure not explicitly illustrated herein.

Figure 6A:
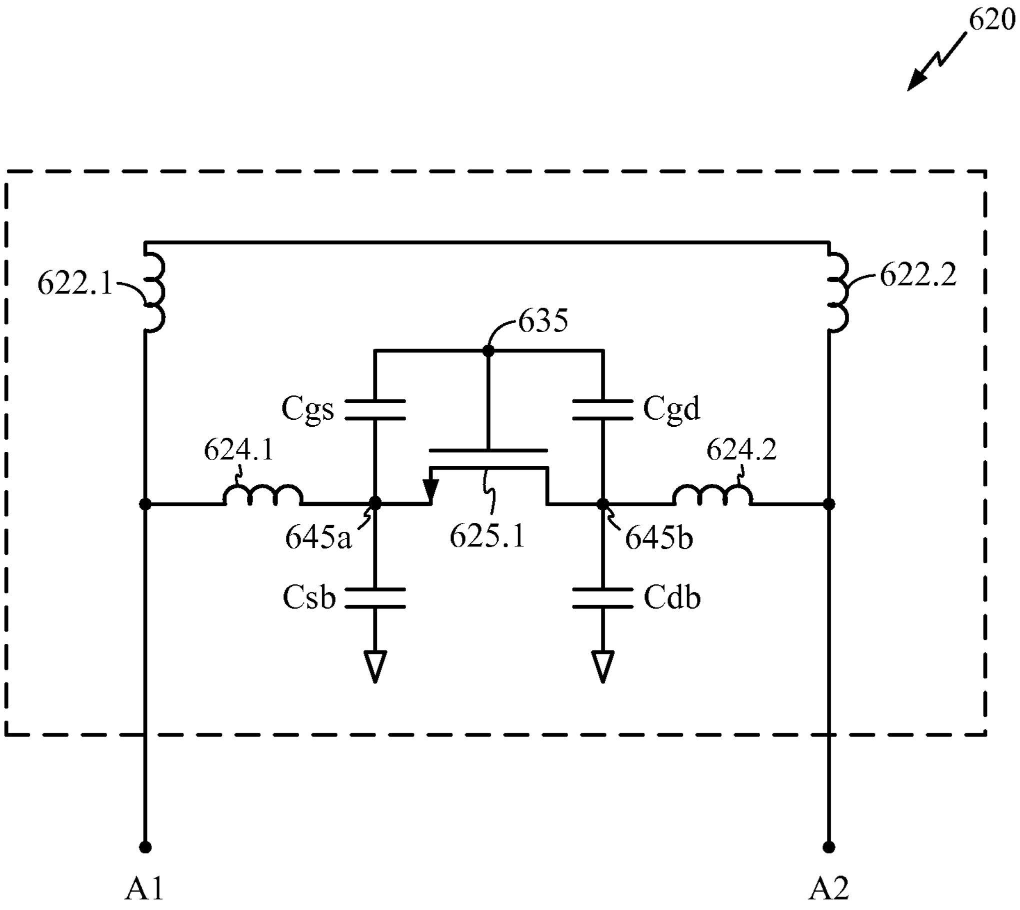
FIG. 6A illustrates in detail various parasitic elements that may be present in the switchable inductor network.

FIG. 6A illustrates in detail various parasitic elements that may be present in the switchable inductor network 620. In FIG. 6A, the primary inductor 622 is shown split into two series-coupled inductors 622.1 and 622.2, and the switch 625 in FIG. 6 is shown implemented as an NMOS switch 625.1. The NMOS switch 625.1 includes various associated parasitic capacitances, including the gate-to-source capacitance (Cgs), gate-to-drain capacitance (Cgd), source-to-bulk capacitance (Csb), and drain-to-bulk capacitance (Cdb) as shown. One of ordinary skill in the art will appreciate that when the switch 625.1 is turned on, the parasitic capacitances Cgs and Cgd will have negligible effect assuming that the on-resistance of the switch 625.1 is small, while the parasitic capacitances Csb and Cdb will also have negligible effect as nodes 645*a* and 645*b* (representing the source and drain nodes of the transistor 625.1, respectively) are assumed to be close to differential ground. Thus, due to the symmetric layout of the switchable inductor network 620, and the presence of the differential ground node within the network, the negative effects of parasitic devices in the circuit may advantageously be reduced in certain cases.

Figure 7:
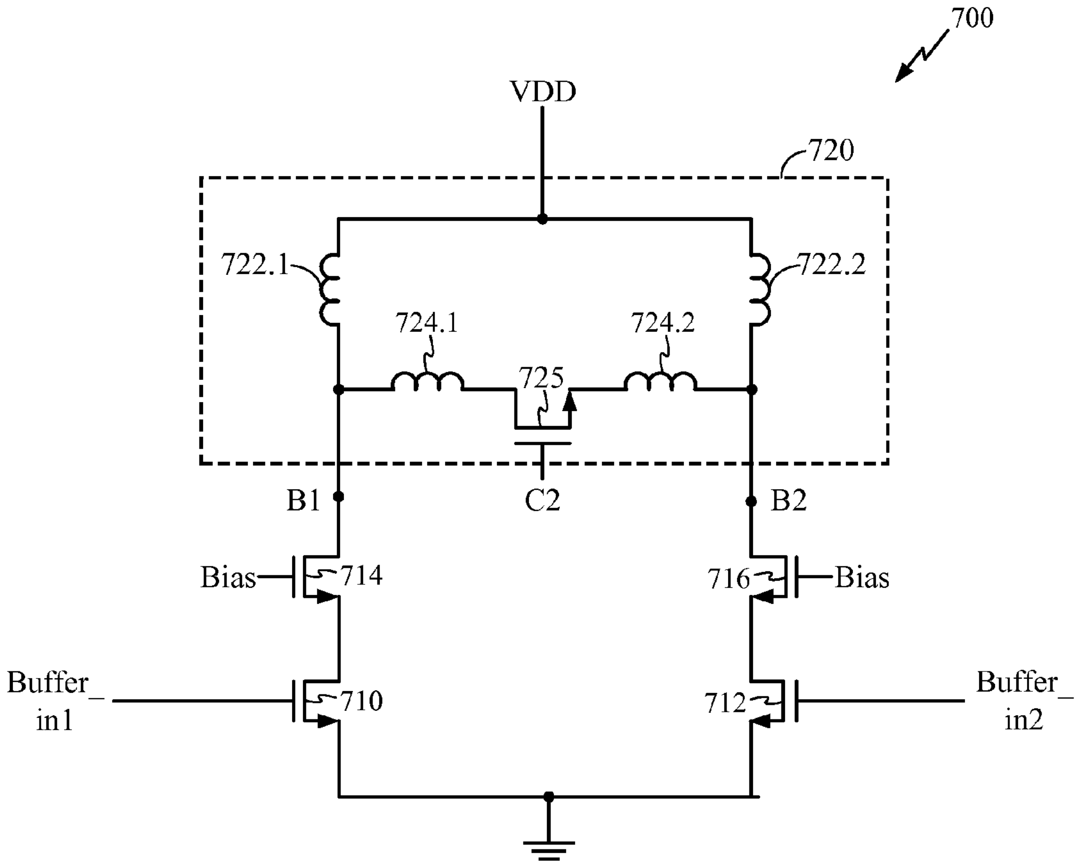
FIG. 7 illustrates an exemplary embodiment of a local oscillator (LO) buffer utilizing a switchable inductor network according to the present disclosure.

FIG. 7 illustrates an exemplary embodiment 700 of an LO buffer utilizing a switchable inductor network according to the present disclosure. In FIG. 7, transistors 710, 712, 714, 716 are arranged in a differential cascode configuration, with inputs Buffer_in1 and Buffer_in2 coupled to transistors 710, 712, and the switchable inductor network 720 coupled to the differential output nodes B1 and B2 as the load. In accordance with the principles earlier described herein, the inductance presented by the network 720 at nodes B1 and B2 may be selected by setting the control signal C2 controlling the switch 725. In an exemplary embodiment, the switchable inductor network 720 may be physically laid out using the topology shown in, e.g., FIG. 5.

One of ordinary skill in the art will appreciate that in the embodiment 700, the output nodes B1 and B2 are not directly coupled to the switch 725, and so parasitic capacitances of the switch 725 are advantageously isolated from the output nodes B1 and B2.

Figure 8:
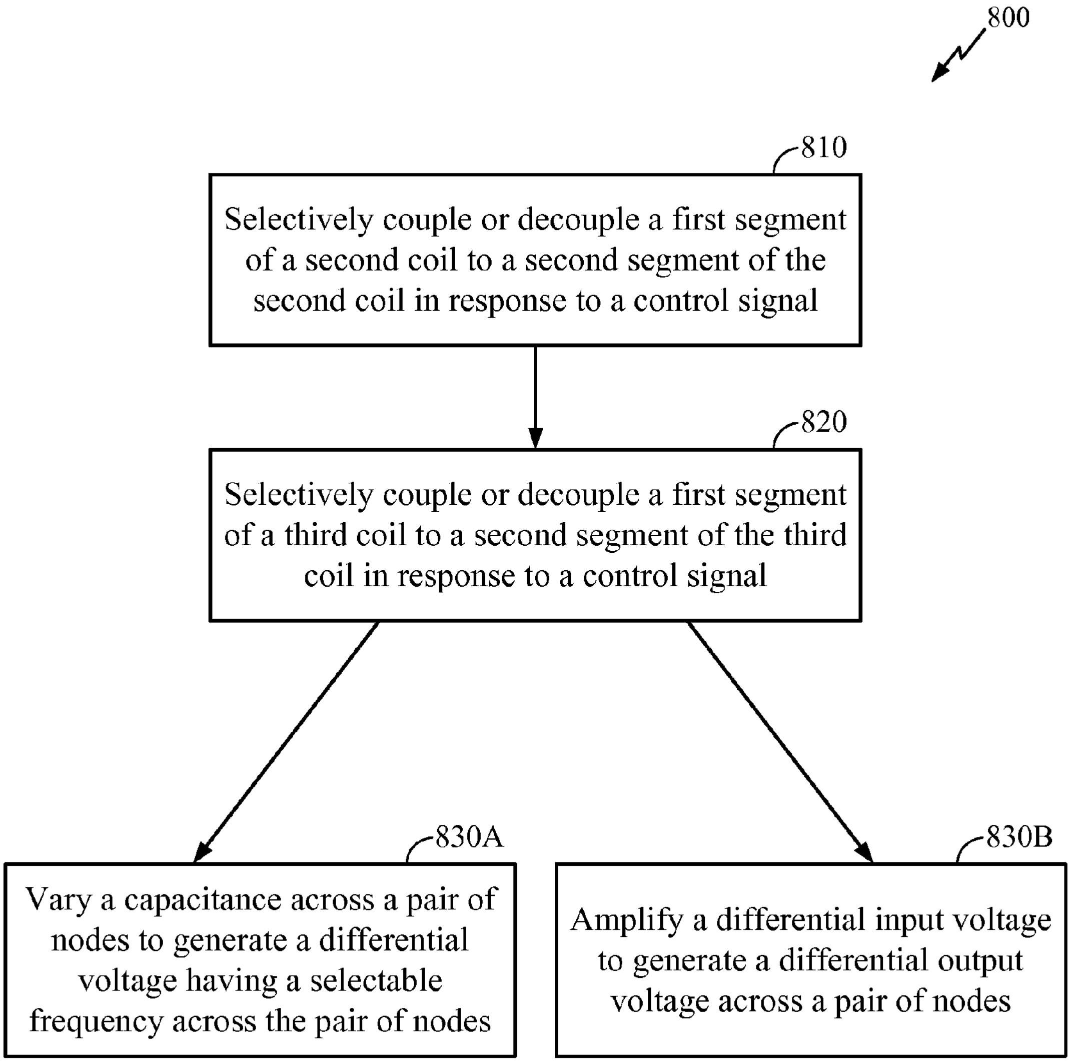
FIG. 8 illustrates an exemplary method according to the present disclosure.

FIG. 8 illustrates an exemplary method 800 according to the present disclosure. Note the method 800 is shown for illustrative purposes only, and is not meant to restrict the scope of the present disclosure to any particular method.

In FIG. 8, a method is shown for providing a selectable inductance across a pair of nodes in a switchable inductor network, the switchable inductor network comprising a first coil having terminals coupled to the pair of nodes, the switchable inductor network further comprising a second coil having terminals coupled to the pair of nodes, the second coil comprising at least a first segment and a second segment.

At step 810, the first segment is selectively coupled or decoupled to the second segment in response to a control signal.

At step 820, the switchable inductor network further comprises a third coil having terminals coupled to the pair of nodes, the third coil comprising at least a first segment and a second segment, and the first segment of the third coil is selectively coupled or decoupled to the second segment of the third coil in response to a control signal.

At step 830A, a capacitance across the pair of nodes is varied to generate a differential voltage having a selectable frequency across the pair of nodes.

At step 830B, a differential input voltage is amplified to generate a differential output voltage across the pair of nodes.

One of ordinary skill in the art will appreciate that either of steps 830A or 830B, or both steps 830A and 830B in conjunction, may be combined with steps 810 and 820 in exemplary embodiments of the present disclosure.

Figure 9:
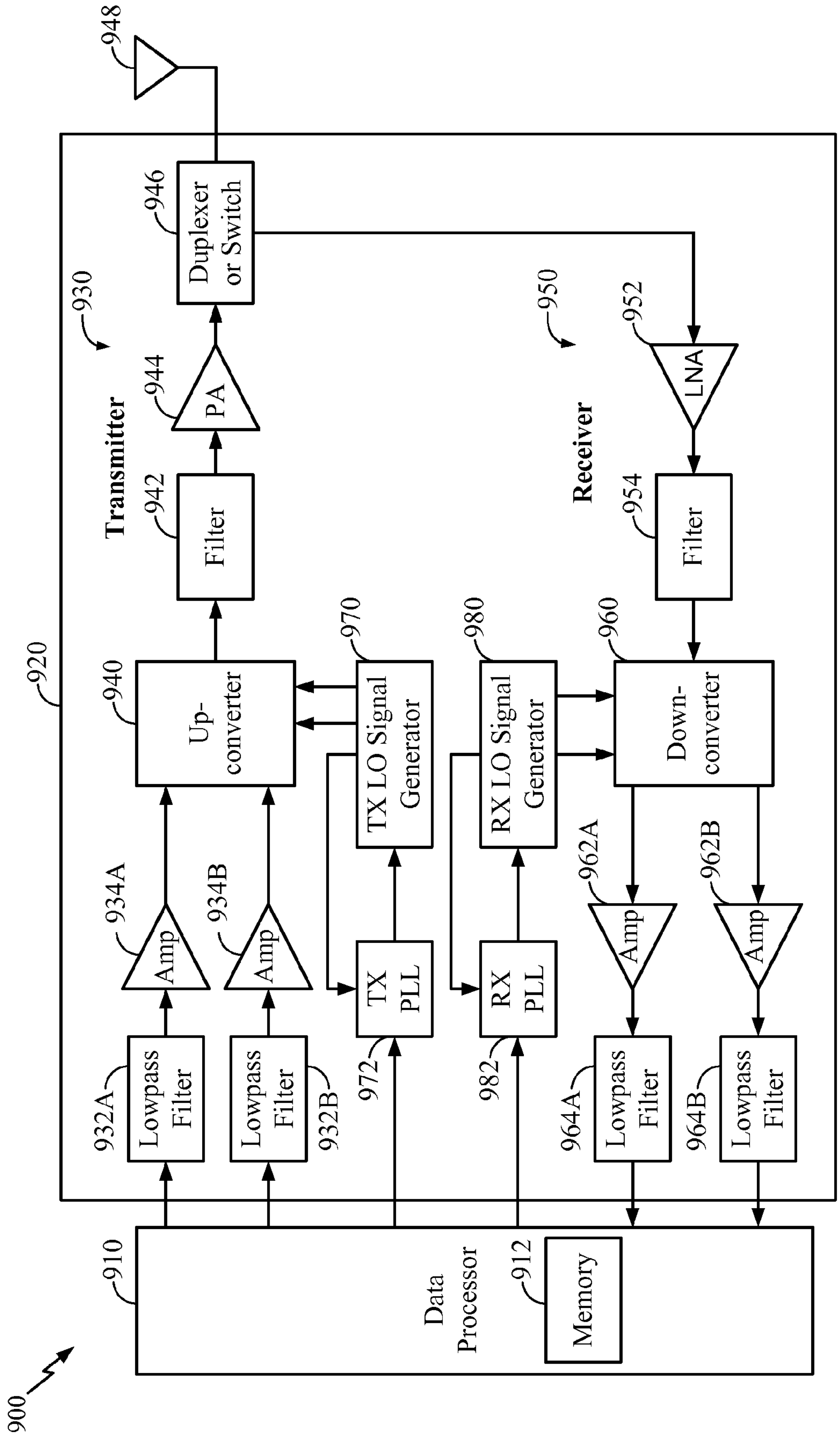
FIG. 9 illustrates a block diagram of a design of a wireless communication device in which the techniques of the present disclosure may be implemented.

FIG. 9 illustrates a block diagram of a design of a wireless communication device 900 in which the techniques of the present disclosure may be implemented. In the design shown in FIG. 9, wireless device 900 includes a transceiver 920 and a data processor 910 having a memory 912 to store data and program codes. Transceiver 920 includes a transmitter 930 and a receiver 950 that support bi-directional communication. In general, wireless device 900 may include any number of transmitters and any number of receivers for any number of communication systems and frequency ranges.

A transmitter or a receiver may be implemented with a super-heterodyne architecture or a direct-conversion architecture. In the super-heterodyne architecture, a signal is frequency converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the design shown in FIG. 9, transmitter 930 and receiver 950 are implemented with the direct-conversion architecture.

In the transmit path, data processor 910 processes data to be transmitted and provides I and Q analog output signals to transmitter 930. Within transmitter 930, lowpass filters 932*a* and 932*b* filter the I and Q analog output signals, respectively, to remove undesired images caused by the prior digital-to-analog conversion. Amplifiers (Amp) 934*a* and 934*b* amplify the signals from lowpass filters 932*a* and 932*b*, respectively, and provide I and Q baseband signals. An upconverter 940 upconverts the I and Q baseband signals with I and Q transmit (TX) local oscillating (LO) signals from a TX LO signal generator 970 and provides an upconverted signal. A filter 942 filters the upconverted signal to remove undesired images caused by the frequency upconversion as well as noise in a receive frequency range. A power amplifier (PA) 944 amplifies the signal from filter 942 to obtain the desired output power level and provides a transmit RF signal. The transmit RF signal is routed through a duplexer or switch 946 and transmitted via an antenna 948.

In the receive path, antenna 948 receives signals transmitted by base stations and provides a received RF signal, which is routed through duplexer or switch 946 and provided to a low noise amplifier (LNA) 952. The received RF signal is amplified by LNA 952 and filtered by a filter 954 to obtain a desired RF input signal. A downconverter 960 downconverts the RF input signal with I and Q receive (RX) LO signals from an RX LO signal generator 980 and provides I and Q baseband signals. The I and Q baseband signals are amplified by amplifiers 962*a* and 962*b* and further filtered by lowpass filters 964*a* and 964*b* to obtain I and Q analog input signals, which are provided to data processor 910.

TX LO signal generator 970 generates the I and Q TX LO signals used for frequency upconversion. RX LO signal generator 980 generates the I and Q RX LO signals used for frequency downconversion. Each LO signal is a periodic signal with a particular fundamental frequency. A TX PLL 972 receives timing information from data processor 910 and generates a control signal used to adjust the frequency and/or phase of the TX LO signals from LO signal generator 970. Similarly, an RX PLL 982 receives timing information from data processor 910 and generates a control signal used to adjust the frequency and/or phase of the RX LO signals from LO signal generator 980. In an embodiment, an LO buffer (not shown) may be provided at the output of the TX LO signal generator 970 or the RX LO signal generator 980 to buffer the VCO output from the subsequent load.

One of ordinary skill in the art will appreciate that the switchable inductor techniques of the present disclosure may readily be applied to the design of various parts of the transceiver 920 described above. For example, a VCO used in the TX LO signal generator 970 or the RX LO signal generator 980 may include a switchable inductor network in an LC tank. Alternatively, or in conjunction, the LO buffer for the TX LO signal generator 970 or the RX LO signal generator 980 may include a switchable inductor as a load. Alternatively, or in conjunction, other circuit blocks of the transceiver 920 may include a switchable inductor according to the present disclosure. Such exemplary embodiments are contemplated to be within the scope of the present disclosure.

FIG. 9 shows an example transceiver design. In general, the conditioning of the signals in a transmitter and a receiver may be performed by one or more stages of amplifier, filter, upconverter, downconverter, etc. These circuit blocks may be arranged differently from the configuration shown in FIG. 9. Furthermore, other circuit blocks not shown in FIG. 9 may also be used to condition the signals in the transmitter and receiver. Some circuit blocks in FIG. 9 may also be omitted. All or a portion of transceiver 920 may be implemented on one or more analog integrated circuits (ICs), RF ICs (RFICs), mixed-signal ICs, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. An apparatus providing a selectable inductance across a pair of nodes, the apparatus comprising a switchable inductor network comprising:

a first coil having terminals directly connected to first and second nodes, the first coil comprising multiple turns, wherein the first coil comprises a first inductor and a second inductor, wherein the first inductor is coupled in series with the second inductor, and wherein a differential ground is between the first inductor and the second inductor;

a second coil nested entirely within a region defined by the multiple turns of the first coil and comprising first and second segments, wherein a first terminal of the first segment is directly connected to the first node and a first terminal of the second segment is directly connected to the second node, wherein the first and the second segments comprise multiple turns and at least one turn of the first segment overlaps at least one turn of the second segment without direct electrical contact; and a switch connected between a second terminal of the first segment and a second terminal of the second segment and configured to selectively couple or decouple the first segment to the second segment in response to a control signal, the switch coupling the first and second segments to differential ground on closing the switch.

2. The apparatus of claim 1, the switchable inductor network formed on at least one of an integrated circuit (IC) and a printed circuit board (PCB) wherein:

the first coil comprises a first conductive trace located within a selected region; and the second coil comprises a second conductive trace located within the selected region and nested entirely within an inner region defined by the first conductive trace of the first coil.

3. The apparatus of claim 2, the second conductive trace having a width less than or equal to a width of the first conductive trace.

4. The apparatus of claim 1, the switchable inductor network further comprising:

a third coil comprising third and fourth segments, wherein a first terminal of the third segment is connected to the first node and wherein a first terminal of the fourth segment is connected to the second node; and a second switch configured to selectively couple or decouple a second terminal of the third segment to a second terminal of the fourth segment in response to a second control signal.

5. The apparatus of claim 2, the first coil having multiple turns within the selected region, and the second coil having multiple turns within the inner region.

6. The apparatus of claim 5, at least one turn overlapping another turn without direct electrical contact.

7. The apparatus of claim 6, the at least one turn being formed from an upper metal layer, the another turn being formed from a lower metal layer.

8. The apparatus of claim 2, the first and second coils each being symmetric about an axis, the first and second nodes further being positioned symmetrically about said axis.

9. The apparatus of claim 1, the switch comprising a transistor, a drain terminal and a source terminal of the transistor, wherein the drain terminal is connected to the second terminal of the first segment, and wherein the source terminal is connected to the second terminal of the second segment.

10. The apparatus of claim 1, further comprising:

a voltage-controlled oscillator comprising said switchable inductor network.

11. The apparatus of claim 1, further comprising:

an amplifier, output nodes of the amplifier coupled to the pair of nodes of said switchable inductor network.

12. The apparatus of claim 1, the switch connected between the second terminal of the first segment and the second terminal of the second segment to balance parasitic capacitances between the first and second nodes.

13. A method for providing a selectable inductance across first and second nodes in a switchable inductor network, the switchable inductor network comprising a first coil having terminals directly connected to the first and second nodes, wherein the first coil comprises a first inductor and a second inductor, wherein the first inductor is coupled in series with the second inductor, and wherein a differential ground is between the first inductor and the second inductor, the first coil comprising multiple turns, the switchable inductor network further comprising a second coil nested entirely within a region defined by the multiple turns of the first coil and comprising first and second segments, wherein a first terminal of the first segment is directly connected to the first node and wherein a first terminal of the second segment is directly connected to the second node, the first and the second segments comprising multiple turns and at least one turn of the first segment overlapping at least one turn of the second segment without direct electrical contact, the method comprising:

selectively coupling or decoupling a second terminal of the first segment to a second terminal of the second segment in response to a control signal using a switch, the switch coupling the first and second segments to differential ground on closing the switch.

14. The method of claim 13, the switchable inductor formed on at least one of an integrated circuit and a printed circuit board wherein:

the first coil comprises a first conductive trace located within a selected region; and the second coil comprises a second conductive trace located within the selected region and nested entirely within an inner region defined by the first conductive trace of the first coil.

15. The method of claim 14, the switchable inductor network further comprising a third coil comprising third and fourth segments, wherein a first terminal of the third segment is connected to the first node and wherein a first terminal of the fourth segment is connected to the second node, the method further comprising:

selectively coupling or decoupling a second terminal of the third segment to a second terminal of the fourth segment in response to a second control signal.

16. The method of claim 13, further comprising varying a capacitance across the pair of nodes to generate a differential voltage having a selectable frequency across the pair of nodes.

17. The method of claim 13, further comprising amplifying a differential input voltage to generate a differential output voltage across the pair of nodes.

18. A device for wireless communications, the device comprising:

a local oscillator (LO) signal generator, the LO signal generator comprising a switchable inductor network to provide selectable inductance across first and second nodes, the switchable inductor network comprising:

a first coil having terminals directly connected to the first and second nodes, the first coil comprising multiple turns, wherein the first coil comprises a first inductor and a second inductor, wherein the first inductor is coupled in series with the second inductor, and wherein a differential ground is between the first inductor and the second inductor;

a second coil nested entirely within a region defined by multiple turns of the first coil and comprising first and second segments, wherein a first terminal of the first segment is directly connected to the first node and wherein a first terminal of the second segment is directly connected to the second node, wherein the first and the second segments comprise multiple turns and at least one turn of the first segment overlaps at least one turn of the second segment without direct electrical contact; and a switch connected between a second terminal of the first segment and a second terminal of the second segment and configured to selectively couple or decouple the first segment to the second segment in response to a control signal to provide the selectable inductance, the switch coupling the first and second segments to differential ground on closing the switch.

19. An apparatus providing a selectable inductance across a pair of nodes, the apparatus comprising:

means for a first inductance directly connected to first and second nodes, wherein the means for the first inductance comprises multiple turns, wherein the first inductance comprises a first inductor and a second inductor, wherein the first inductor is coupled in series with the second inductor, and wherein a differential ground is between the first inductor and the second inductor;

means for a second inductance, wherein a first terminal of the second inductance is directly connected to the first node;

means for a third inductance, wherein a first terminal of the third inductance is directly connected to the second node, wherein the means for the second inductance and the means for the third inductance are nested entirely within a region defined by the multiple turns of the means for the first inductance, and wherein the means for the second inductance and the means for the third inductance comprise multiple turns and at least one turn of the means for the second inductance overlaps at least one turn of the means for the third inductance without direct electrical contact; and means for selectively coupling or decoupling a second terminal of the means for the second inductance to a second terminal of the means for the third inductance in response to a control signal, the means for selectively coupling or decoupling couples the means for the second inductance and the means for third inductance to differential ground on coupling the second terminal of the means for the second inductance to the second terminal of the means for the third inductance.

20. The apparatus of claim 19, further comprising means for varying a capacitance across the first and second nodes to generate a differential voltage having a selectable frequency.

21. The apparatus of claim 19, the means for selectively coupling or decoupling comprising means for balancing parasitic capacitances between the first and second nodes.

* * * * *